US012611872B2

(12) United States Patent
McBride et al.

(10) Patent No.: US 12,611,872 B2
(45) Date of Patent: Apr. 28, 2026

(54) LENTICULAR PRINTER

(71) Applicant: FOTOSTAX, INC., Bethesda, MD (US)

(72) Inventors: Jonathan Neal McBride, London (GB); Abhishek Panigrahi, London (GB); Yusuke Enomoto, London (GB)

(73) Assignee: FOTOSTAX, INC., Bethesda, MD (US)

(*) Notice: Subject to any disclaimer, the term of this patent is extended or adjusted under 35 U.S.C. 154(b) by 108 days.

(21) Appl. No.: 18/695,985

(22) PCT Filed: Sep. 27, 2022

(86) PCT No.: PCT/EP2022/076864
§ 371 (c)(1),
(2) Date: Mar. 27, 2024

(87) PCT Pub. No.: WO2023/046994
PCT Pub. Date: Mar. 30, 2023

(65) Prior Publication Data

US 2024/0399761 A1 Dec. 5, 2024

(30) Foreign Application Priority Data

Sep. 27, 2021 (GB) ...................................... 2113751

(51) Int. Cl.
*B41J 2/325* (2006.01)
*B41J 13/03* (2006.01)
(Continued)

(52) U.S. Cl.
CPC ............... *B41J 2/325* (2013.01); *B41J 13/03* (2013.01); *B41J 15/044* (2013.01); *B41M 5/0358* (2013.01)

(58) Field of Classification Search
CPC ............. B41M 3/06; G02B 27/12; B41N 1/00
See application file for complete search history.

(56) References Cited

U.S. PATENT DOCUMENTS

2011/0188124 A1* 8/2011 Yanagita .................. B41M 3/06 101/401.1
2011/0285974 A1 11/2011 Yoshida
2024/0399761 A1* 12/2024 Mcbride .................... B41J 2/32

FOREIGN PATENT DOCUMENTS

JP 2011-156709 A 8/2011
WO WO2009/037166 3/2009
WO WO-2023046994 A1 * 3/2023 .......... B41M 5/0358

OTHER PUBLICATIONS

Translation of WO2023046994.*

(Continued)

*Primary Examiner* — Sonya M Sengupta
(74) *Attorney, Agent, or Firm* — Dority & Manning, P.A.

(57) ABSTRACT

An image forming apparatus for lenticular image printing, the apparatus comprising: a housing enclosing a plurality of rollers and a dye sublimation print head comprising a heating element; wherein the plurality of rollers is configured to load a dye sublimation ribbon into the dye sublimation print head and move an image substrate from a store of image substrate, or a lenticular lens substrate from a store of lenticular lens substrate, to the dye sublimation print head, wherein the dye sublimation print head is configured to use the ribbon to form an image on the image substrate or on a surface of the lenticular lens substrate, the image comprising a plurality of interlaced images; wherein the plurality of rollers is configured to move the lenticular lens substrate or the image substrate into contact with the other of the lenticular lens substrate or the image substrate, and wherein the image forming apparatus is configured to secure the lenticular lens substrate to the image substrate to form a lenticular image.

19 Claims, 8 Drawing Sheets

(51) Int. Cl.
*B41J 15/04* (2006.01)
*B41M 5/035* (2006.01)

(56) References Cited

OTHER PUBLICATIONS

Office Action (with English translation) in corresponding JP Application No. 2024-518779, dated May 20, 2025, in 14 pgs.
International Preliminary Report on Patentability for corresponding Application No. PCT/EP2022/076864, mailed Apr. 11, 2024, 13 pages.
PCT International Search Report and Written Opinion for corresponding PCT Application No. PCT/EP2022/076864, mailed Feb. 13, 2023, 17 pages.

* cited by examiner

LENTICULAR PRINTER

CROSS REFERENCE TO RELATED APPLICATIONS

This application is the U.S. National Stage entry of International Application No. PCT/EP2022/076864, filed on Sep. 27, 2022, which, in turn, claims priority to GB Patent Application No. 2113751.8, filed on Sep. 27, 2021, both of which are hereby incorporated herein by reference in their entireties for all purposes.

FIELD

The present disclosure describes an image forming apparatus for lenticular image printing, a cartridge for use therewith and a method of use thereof.

BACKGROUND

Lenticular printing is a technology in which lenticular lenses (a technology that is also used for 3D displays) are used to produce printed images with an illusion of depth, or the ability to change or move as the image is viewed from different angles.

Examples of lenticular printing include flip and animation effects such as winking eyes, and modern advertising graphics that change their message depending on the viewing angle.

Lenticular printing is a multi-step process which consists of creating a lenticular image from at least two images, and combining it with a lenticular lens. This process can be used to create various frames of animation (for a motion effect), offsetting the various layers at different increments (for a 3D effect), or simply to show a set of alternative images which may appear to transform into each other. Once the various images are collected, they are flattened into individual, different frame files, and then digitally combined into a single final file in a process called interlacing.

From there the interlaced image can be printed to a substrate such as a photo paper substrate and laminated to the lenticular lens substrate. The lenticular lens substrate is a substrate bearing a lenticular lens, also referred to as a lenticular array e.g. an array of cylindrical lenses. The substrate material may comprise a polymer, e.g. the array may be moulded in a plastic such as PMMA, PETG, or polycarbonate.

The combined lenticular print will show two or more different images simply by changing the angle from which the print is viewed. If more (30+) images are used, taken in a sequence, they can even show a short animation sequence of about one second. Though normally produced in sheet form, by interlacing simple images or different colours throughout the artwork, lenticular images can also be created in roll form with 3D effects or multi-colour changes. Alternatively, one can use one or several images of the same object, taken from slightly different angles, and then create a lenticular print which shows a stereoscopic 3D effect. 3D effects are achieved in a side-to-side (left-to-right) direction, as the viewer's left eye is then seeing from a slightly different angle to the right to achieve the stereoscopic effect. Other effects, like morphs, motion, and zooms work better (less ghosting or latent effects) as top-to-bottom effects, but can be achieved in both directions.

A problem with known lenticular printing methods is that they are not suitable for use in desktop sized or smaller, consumer devices and typically require a great deal of manual input from a skilled specialist, which is time consuming and impractical at scale and therefore expensive. This makes lenticular printing inaccessible for the average consumer.

The present disclosure aims to address these and other problems.

SUMMARY

In general terms, the present disclosure provides a miniaturised, desktop sized or smaller lenticular printing device suitable for use by an average consumer.

According to a first aspect, there is provided an image forming apparatus for lenticular image printing. In implementations the apparatus comprises a housing enclosing a plurality of rollers and a dye sublimation print head comprising a heating element. In implementations the apparatus also comprises a dye sublimation ribbon, a store of image substrate such as photo paper, white vinyl, one or more layers of paint or other coating, and a store of lenticular lens substrate. Whilst photo paper is used as a primary example herein, it is envisaged that other image substrates may also be used where applicable (for example, in implementations where an image is formed on the lenticular lens substrate first and the image substrate is applied thereto, as will be described below). These image substrates may collectively or individually be provided in one or more cartridges or packets, e.g. one or more removable cartridges, coupled to, e.g. held within, the housing. A removable cartridge may comprise, e.g. be configured to hold, one or more of, or two or more of: a dye sublimation ribbon, a store of photo paper substrate, and a store of lenticular lens substrate. In implementations the plurality of rollers is configured to load the ribbon into the dye sublimation print head and move the photo paper substrate from the store to the dye sublimation print head. In implementations the dye sublimation print head is configured to use the ribbon to form an image on the photo paper substrate or on a surface of the lenticular lens substrate. In implementations the image comprises a plurality of interlaced images. In implementations the plurality of rollers is configured to move the lenticular lens substrate into contact with the photo paper substrate or vice versa. In implementations, the image forming apparatus is configured to secure the lenticular lens substrate to the image substrate to form a lenticular image.

In some implementations, a surface of the lenticular lens substrate is provided with an adhesive having a backing layer, and wherein one or more of the plurality of rollers is configured to peel the backing layer from the lenticular lens substrate when moving the lenticular lens substrate into contact with the image substrate.

Advantageously, this provides an improved user experience because the user does not need to manually remove the backing layer prior to inserting the lenticular lens substrate into the apparatus (e.g. with the cartridge), and because it allows the adhesive on the lenticular lens substrate to have a longer shelf life as the backing layer preserves and prevents it from curing while in storage. Furthermore, this approach reduces energy expenditure of using either heating elements or UV light to bond the lenticular lens and photo paper. A further advantage of this approach is in how it minimizes internal risk of adhesion secretion or adhesion bonding with other internals of the invention.

In some implementations the heating element of the dye sublimation print head is configured to heat the lenticular lens substrate and/or photo paper substrate to bond the lenticular lens substrate to the photo paper substrate to form a printed lenticular image.

Advantageously, the use of the heating element in the dye sublimation print head to bond the lenticular lens substrate to the photo paper substrate means it is not necessary to provide bulky and expensive further heating elements in the device to bind the two substrates to each other to compete the lenticular image. This is particularly advantageous because plurality of rollers align the substrates under the dye sublimation print head where the image was formed without needing to move them to a separate alignment module or position in the device and without specific user input, thereby reducing the space requirements of the apparatus and ensuring the user does not need to manually align the lenticular lens substrate with the photo paper substrate as is the case with known methods. In implementations the photo paper substrate comprises a substrate suitable for dye sublimation printing.

Additional or alternative methods of bonding are also envisaged. For example, in some implementations, one or more of the plurality of rollers is configured to apply a pressure to the lenticular lens substrate and/or image substrate to bond the lenticular lens substrate to the image substrate to form the lenticular image. Additionally or alternatively, the image forming apparatus comprises a source of ultraviolet light configured to illuminate the lenticular lens substrate and/or image substrate to bond the lenticular lens substrate to the image substrate to form the lenticular image. In each case, the adhesive used is envisaged to be heat, pressure and/or UV light activated as applicable.

As will be appreciated, these arrangements allow for a number of different ways of forming a lenticular image, depending on whether the image is formed on the image substrate or back of the lenticular lens substrate first and how the image substrate is secured to the lenticular lens substrate.

For example, each of the following ways is envisaged, categorised into whether or not the image is formed on the image substrate first or back of the lenticular lens substrate first.

Image Formed on Image Substrate First:

- Example 1: Image formed on image substrate first. The lenticular lens substrate is pre-treated with adhesive. A backing layer (for example a plastic backing) is provided over the adhesive layer which can be removed e.g. peeled off by the printer using the rollers or other suitable mechanism as the lenticular lens substrate is moved into contact and/or pressed onto the image substrate to adhere it to the image substrate.
- Example 2: Image formed on image substrate first. The lenticular lens substrate is pre-treated with a heat-activated adhesive which is activated by the image forming apparatus, for example by the heating element described above, as the lenticular lens substrate is moved into contact and/or pressed onto the image substrate to adhere it to the image substrate.
- Example 3: Image formed on image substrate first. The lenticular lens substrate is pre-treated with a pressure-activated adhesive which is activated by the image forming apparatus, for example by one or more of the plurality of rollers or other suitable mechanism, as the lenticular lens substrate is moved into contact and/or pressed onto the image substrate to adhere it to the image substrate.
- Example 4: Image formed on image substrate first. The lenticular lens substrate is pre-treated with a UV-activated adhesive which is activated by the UV source described above as the lenticular lens substrate is moved into contact and/or pressed onto the image substrate to adhere it to the image substrate.

In each of these examples, the image substrate may be photo paper, white vinyl or other material.

Image Formed on the Lenticular Lens Substrate First:

- Example 6: The image is formed on the back of the lenticular lens substrate and, once the image is formed, a layer of white vinyl or other material is heat-pressed onto the backing of the lenticular lens substrate using a suitable pressing mechanism. The heat source may again be the above-described heating element.
- Example 7: A layer of paint or coating is applied to the backing of the lenticular lens. The material of the layer of paint and/or coating is sufficiently strong and resilient such that no additional layer of protection such as that provided by a white vinyl material is required. In this context, the layer of paint or coating itself is the image substrate.

In general terms, the above arrangements are advantageous for a number of reasons.

Firstly, the use of a pre-filled, removable cartridge, which may also be referred to as a cartridge, ensures the photo paper substrate and lenticular lens substrate are compatible, positioned correctly for the plurality of rollers to receive the substrates into the device and thereby simplifies the loading of the device for the user. Accordingly, in some implementations, the plurality of rollers comprises a first roller and a press configured to align the photo paper substrate and lenticular lens substrate during said heating, for example at said dye sublimation print head.

Secondly, the inventors have realised that dye sublimation printing is particularly suited to lenticular printing in a desktop or smaller, consumer device compared to, for example, ink-jet printing or other printing methods. This is because for the lenticular image to be displayed correctly, the precision of the printing is important, even slight artefacts or incorrectly printed elements in the image can result in the image being displayed through the lens substrate incorrectly. Ink-jet printers are particularly sensitive to orientation as gravity affects the locus of ink droplets. As consumers often orient their devices at many different angles, this may result in a low-quality print or device malfunction. In contrast, dye sublimation printing may be used at any orientation thus making it particularly suitable for lenticular printing in a consumer device. Synergistically, it also allows the heating element of the dye sublimation printing head to be used to bind the lenticular lens substrate to the photo paper substrate as described above.

In some implementations, the plurality of rollers comprises: a second roller positioned at the removable cartridge for moving the photo paper substrate from the storage bay when the removable cartridge is coupled to the housing; a third roller positioned at the removable cartridge for moving the lenticular lens substrate from the store when the removable cartridge is coupled to the housing; and a fourth roller positioned at the dye sublimation print head for moving the photo paper substrate past the dye sublimation print head during said forming of said image. In some implementations, the first roller and press are positioned at an opening in the housing and configured to eject the lenticular image from the apparatus upon completion.

Advantageously, this arrangement of rollers allows the lenticular image to be printed with little input from the user, thereby making it suitable for a consumer device.

In some implementations, the image forming apparatus comprises a controller unit and a motor, the motor being coupled to the plurality of rollers with one or more gear assemblies, wherein the controller unit is configured to control said motor to drive said plurality of rollers, and to control said dye sublimation print head during said forming of the lenticular image.

Advantageously, the controller unit, motor and one or more gear assemblies automate the lenticular printing process for the user without requiring manual alignment or positioning of the lenticular lens substrate.

In some implementations, the image forming apparatus comprises a sensor unit coupled to the controller unit and configured to detect insertion of the removable cartridge into the housing and identify a cartridge type of the removable cartridge. In some implementations, the controller unit is configured to prevent the apparatus from forming said lenticular image when the sensor unit is unable to identify the cartridge type. The cartridge type may be used to control the image forming apparatus, in particular to control the image formed on the photo paper substrate, e.g. so that the image is appropriate to the type of cartridge, more specifically substrate materials in the cartridge such as a type of the lenticular lens substrate.

Advantageously and to ensure the user experience of the device is maintained at a high standard, the sensor unit detects whether or not the inserted cartridge is a genuine cartridge produced by a known and trusted manufacturer or if it is a pirated and potentially low-quality copy. For example, if the sensor unit is unable to identify the cartridge type as being from a known and trusted manufacturer, it may indicate that the user experience could be affected and the controller unit accordingly prevents the apparatus from using the cartridge to print a lenticular image. In contrast, if the cartridge type is detected to be a type from a known and trusted manufacturer (e.g. it is 3D lenticular cartridge containing a 3D lenticular lens, photo paper, and a dye sublimation ribbon, or it is a motion lenticular cartridge containing a motion lenticular lens, photo paper, and a dye sublimation ribbon, or it is a static image cartridge containing only photo paper and a dye sublimation ribbon) then the controller unit allows the apparatus to proceed with printing.

In some implementations, the image forming apparatus comprises a communications interface for coupling the controller unit to an external device, such as a mobile device, using a wired or wireless connection.

Advantageously, this allows the user to send the image they wish to print to the apparatus using their own mobile device such as a smartphone, tablet, or other device, for example by using a software application on their device associated with the image forming apparatus. If a wireless connection is used, the communications interface may comprise, for example, a Bluetooth™, WiFi™ or other wireless connection interface. Additionally, or alternatively, if a wired connection is used, the communications interface may comprise a USB-C connection interface, or other connection such as an iPhone™ Lightning port.

In some implementations, the housing defines a shaped receiving surface and a clamp for holding the external mobile device thereon.

Advantageously, the combination of a shaped surface and a clamp allows a mobile device of any shape or size to be held to the device to both improve the user experience and ensure that any connection, wireless and/or wired is maintained during the printing process.

In some implementations, the image forming apparatus comprises a printed circuit board (PCB) enclosed in the housing, wherein the controller unit, sensor unit and communications interface are coupled to the printed circuit board and a power source.

Advantageously, by providing these units and interface on a PCB in the housing, the apparatus is provided as a fully integrated apparatus suitable for consumer use.

In some implementations, the image forming apparatus is further configured to print a static image, the plurality of rollers being configured to move the photo paper substrate from the store to the dye sublimation print head, the dye sublimation print head being configured to use the ribbon to form an image on the photo paper substrate, and the plurality of rollers being further configured to eject the static image from the apparatus upon completion.

Advantageously, a user is thus able to print both lenticular images and static images with the same apparatus without the need for separate printers.

In some implementations, the store of lenticular lens substrate comprises a continuous strip (for example of plastic or other backing material) having a plurality of lenticular lens substrates provided thereon with adhesive. The backing material being configured to peel off in the manner as described above. Optionally, the lenticular lens substrates are provided on the continuous strip spaced apart by predetermined intervals on the same side of the strip, each interval substantially the length of the lenticular lens substrates, and wherein the continuous strip is folded a plurality of times, each fold being at a beginning and at an end of the respective intervals which optionally allows the folded continuous strip to be provided in a stacked configuration inside the store of lenticular lens substrate.

Advantageously, this configuration allows for less energy expenditure in allowing one roller to wrap the plastic layer waste. Further, this arrangement is less likely to jam compared to a configuration where separate pieces of lenticular lens substrate are stacked in a non-continuous way because the roller mechanism that draws the lenticular lens substrate strip forward does not rely on the previous sheet having to draw the next sheet into contact with the roller, as may be the case with an individual-piece configuration. This accordingly improves the reliability of the image forming apparatus.

This configuration also allows the discarded backing strips to be easily collected at a roller without the risk of separate pieces of backing strip causing a jam.

According to a further aspect, there is provided an image forming apparatus for lenticular image printing, the apparatus comprising: a housing enclosing a plurality of rollers and a dye sublimation print head comprising a heating element; and one or more removable cartridges coupled to the housing for holding a dye sublimation ribbon and a store of lenticular lens substrate, wherein the plurality of rollers is configured to load the ribbon into the dye sublimation print head and move the lenticular lens substrate from the store to the dye sublimation print head, wherein the dye sublimation print head is configured to use the ribbon to form an image on a surface of the lenticular lens substrate, the image comprising a plurality of interlaced images; and wherein the dye sublimation print head is configured to use the ribbon to form a protective layer on the printed image.

Advantageously, this provides the means to directly print onto the lens without needing to use photo paper or other image substrate, as is described in a number of the above implementations.

According to a further aspect of the disclosure, there is provided a method for printing a lenticular image, the method comprising: inserting a dye sublimation ribbon, an image substrate; and a lenticular lens substrate into a housing of an image forming apparatus; with a plurality of rollers, loading the ribbon into a dye sublimation print head and moving the photo paper substrate from the store to the dye sublimation print head; with the dye sublimation print head, forming an image on the photo paper substrate, the image comprising a plurality of interlaced images; with the plurality of rollers, moving the lenticular lens substrate into contact with the photo paper substrate; and with a heating element of the dye sublimation print head, heating the lenticular lens substrate and/or photo paper substrate to bond the lenticular lens substrate to the photo paper substrate to form a lenticular image.

In implementations, the step of inserting comprises inserting a removable cartridge comprising said dye sublimation ribbon, a store of said image substrate; and a store of said lenticular lens substrate into a housing of an image forming apparatus.

According to a further aspect of the disclosure, there is provided a computer program comprising instructions to cause the apparatus described above to execute the steps of the method described above.

According to a further aspect of the disclosure, there is provided a computer-readable storage medium having stored thereon the computer program of described above.

According to a further aspect of the disclosure, there is provided a cartridge for use with the image forming apparatus described above, the cartridge comprising one or more of, or two or more of: a dye sublimation ribbon for loading into a dye sublimation print head of the image forming apparatus; a store of image substrate; and a store of lenticular lens substrate.

The cartridge may include a physical or electronic mechanism to indicate to the image forming apparatus whether the lenticular lens substrate is adapted to producing an animated lenticular image or a stereoscopic lenticular image. In this context an animated lenticular image may be an image that exhibits one or more image flips or image morphs (where an image changes discretely or quasi-continuously from one image to another with a change in viewing angle), or image zoom.

In some implementations the lenticular lens substrate (and software) is adapted to producing an animated stereoscopic (3D) lenticular image e.g. to create an animated 3D image that changes with viewpoint.

This method, computer program and computer readable storage medium, and cartridge provide the same advantages as those described above.

According to a further aspect of the disclosure there is provided an image forming apparatus for lenticular image printing from a mobile phone or similar device. The apparatus comprises a tray to support the mobile phone, the tray having a base, a lenticular printing mechanism, and in implementations a wireless communication system for wireless coupling to the mobile phone. The lenticular printing mechanism is built into the base of the tray, i.e. the lenticular printing mechanism is substantially contained within a thickness of the base.

The image forming apparatus may further comprise a removable cartridge to hold at least two of: a dye sublimation ribbon for loading into a dye sublimation print head of the image forming apparatus; a store of image substrate, and a store of lenticular lens substrate. The tray may have a first slot at one edge to receive the cartridge.

The tray may have a second slot at an another edge, which may be the opposite edge or any edge. A direction between the first and second slots may define a direction of a transport path through the lenticular printing mechanism which may be direct or via a number of other paths. For example, a cartridge may be inserted into the first slot in a direction which is perpendicular to the direction of travel. Other directions and configurations are also envisaged. The lenticular printing mechanism may comprise first and second rollers displaced vertically and/or laterally from one another to respectively entrain the image substrate and the lenticular lens substrate from the removable cartridge. The base of the tray may include a dye sublimation printer positioned along the transport path between the first and second rollers and the second slot. The dye sublimation printer may have a dye sublimation print head configured to both print onto the photo paper substrate and secure the lenticular lens substrate to the photo paper substrate. This may be using any of the methods of securing described above.

Implementations of such an arrangement can facilitate provision of a lenticular printer within the base of a tray having a relatively small thickness.

The image forming apparatus may further comprise sensor to sense whether lenticular lens substrate in the removable cartridge is for producing an animated lenticular image or a stereoscopic lenticular image and to generate a substrate type signal.

The image forming apparatus may be configured to communicate the substrate type signal to lenticular printing software, either stored in non-volatile memory in the apparatus or stored in non-volatile memory on the external device such as the mobile phone, tablet or computer, or in the cloud. In implementations image forming apparatus includes a processor controlled by stored instructions in non-volatile memory in the apparatus to generate the interlaced image for printing from one or more images obtained from the mobile phone, e.g. via the wireless communications link.

The lenticular printing software may be configured to receive one or more images from the mobile phone and convert the one or more images to one or more interlaced images for the lenticular printing mechanism to print onto the image substrate. The conversion may be dependent upon the substrate type signal e.g. such that when the substrate type signal indicates that lenticular lens substrate in the removable cartridge is for producing an animated lenticular image the interlaced images create an animated image when combined with the lenticular lens substrate, and when the substrate type signal indicates that lenticular lens substrate in the removable cartridge is for producing a 3D lenticular image the interlaced images create a 3D image when combined with the lenticular lens substrate.

There is also provided a removable cartridge as described above.

Exemplary Lenticular Printing Process Summary

An exemplary, non-limiting description of a lenticular printing process is now described. On an associated app of a mobile device such as a phone the user selects whether they desire to capture and/or print a static image, a 3D image, or a motion image, or alternatively this is determined by identifying the inserted cartridge type.

In some implementations the application software on the phone or other device is configured to enable the user to modify/edit the images before printing. In implementations the application software can enable the user to select multiple individual images and will splice them together to form a lenticular image, which is then output to the printer. Also or instead, multiple images to form the lenticular image may be generated from a single initial image.

The phone or other device sends a photo to the image forming apparatus through either Bluetooth™, Wifi™, or the phone USB-C/Lightning port. The image forming apparatus uses its rollers to grab a piece of photo paper and propels it toward the dye sublimation print head. The print head then applies layers of cyan, magenta, yellow (and potentially black, other colours, and a clear coat) onto the substrate in a multi-pass method.

If the image is lenticular (treated image containing layers of multiple interlaced images, in particular in rows or columns) then the image forming apparatus grips a lenticular lens and aligns it with the printed image on the photo paper (the alignment is done using mechanical means including physical constraints based on the size of the photo paper and the lenticular lens, but can also be done using photosensors to automatically align the lenticular lens with the photo paper). The lenticular lens and the photo paper are brought together towards the dye sublimation print head. The dye sublimation print head heats the adhesive already located on the back of the lenticular lens and bonds the lens to the photo paper. Alternatively or additionally and as described above, the image forming apparatus may be provided with a mechanism to peel a backing layer of the lenticular lens substrate on which an adhesive layer has already been applied. The mechanism may be provided as part of the plurality of rollers.

If the image is a static image, then the image forming apparatus applies a final protective coating on top of the image on the final pass.

The image forming device may be charged through a USB-C port which feeds into the battery.

The image forming apparatus may have a consumables port that ingests one of three types of cartridges:

1. 3D cartridge (contains 3D lenticular lens, photo paper, and a dye sublimation ribbon)
2. Motion cartridge (contains motion lenticular lens, photo paper, and a dye sublimation ribbon)
3. Static cartridge (contains photo paper and a dye sublimation ribbon)

The image forming apparatus may include a sensor that senses whether a cartridge is from a known, trusted manufacturer or if it is a non-authentic product. If the latter, the image forming apparatus may be arranged not to print.

BRIEF DESCRIPTION OF THE DRAWINGS

These and other aspects of the invention will now be further described, by way of example only, with reference to the accompanying figures and reference numerals.

DETAILED DESCRIPTION OF THE DRAWINGS

Figure 1:
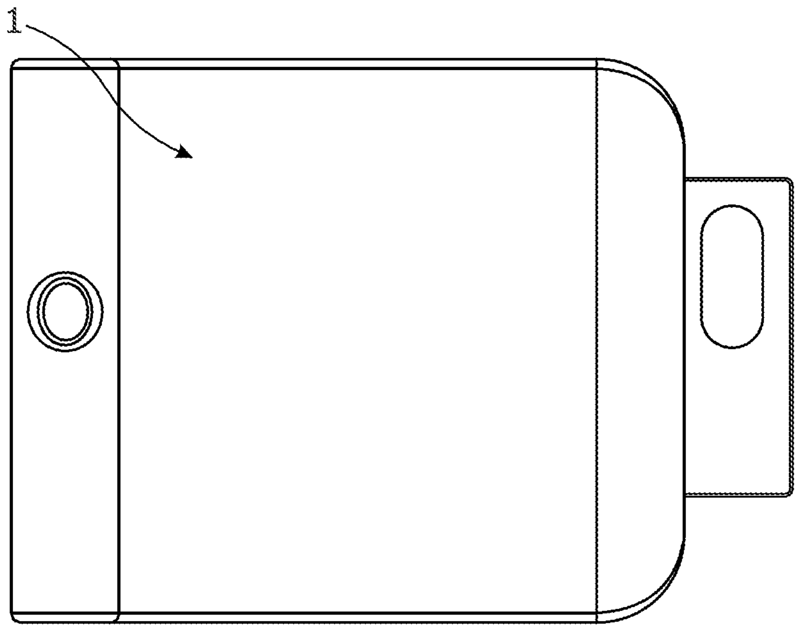
FIG. 1 shows a plan view of the front cover according to the present disclosure.
Figure 2:
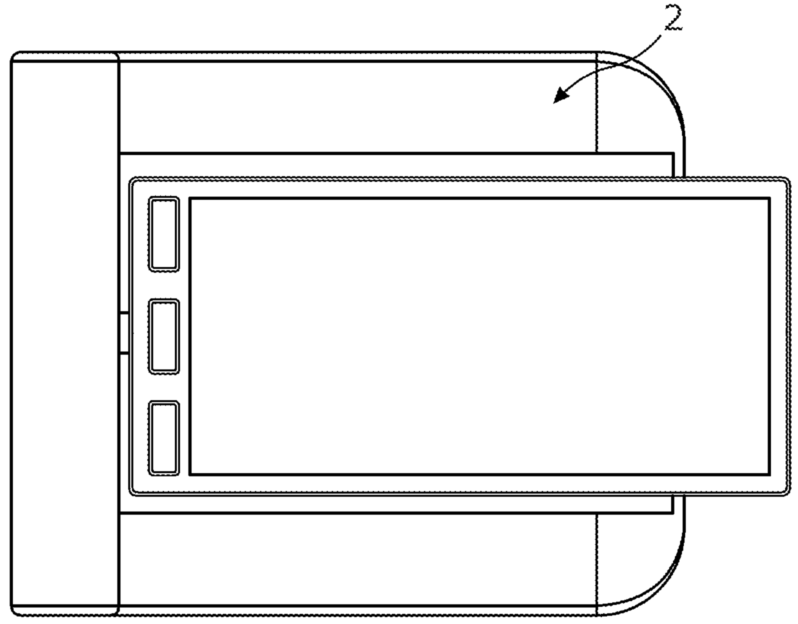
FIG. 2 shows a plan view of the back cover according to the present disclosure.

The front cover 1 seen in FIG. 1 is designed to fit with the back cover 2 seen in FIG. 2. These covers form a hollow shell 3 containing the internal mechanisms of the invention. This shell could be configured to encompass a small tablet or mobile device 4. The front 1 or back 2 cover can contain a clamp system 5 which can be used to hold a small tablet or mobile device 4 in place.

The image forming apparatus illustrated in the Figures is envisaged to include a communication module for near field, allowing the invention to connect to other wireless devices through means of Bluetooth™, NFC™, or WiFi™ for example. The image forming apparatus may include a wired port 6 such as USB-C or Lightning port which allows for direct wired communication to electronic devices.

Figure 3:
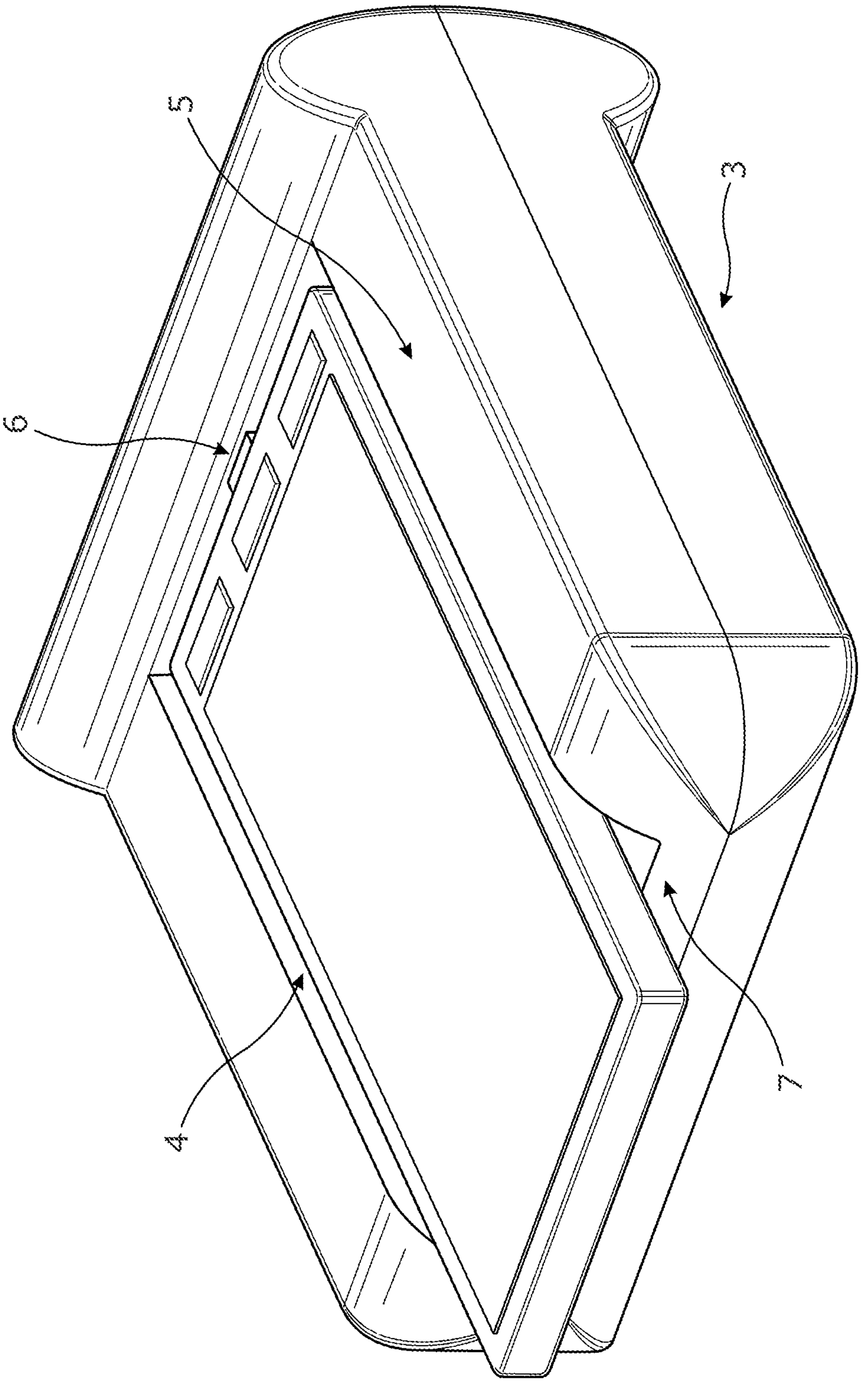
FIG. 3 shows an isometric view of the exterior casing showcasing the consumables port according to the present disclosure.

The image forming apparatus may be configured to include a slot 7 for consumables cartridges to be inserted, as seen in FIG. 3, or a series of slots for specific consumables components to be inserted, such as dye-sublimation ribbon 8, photo paper 9, and lenticular lens 10.

Figure 4:
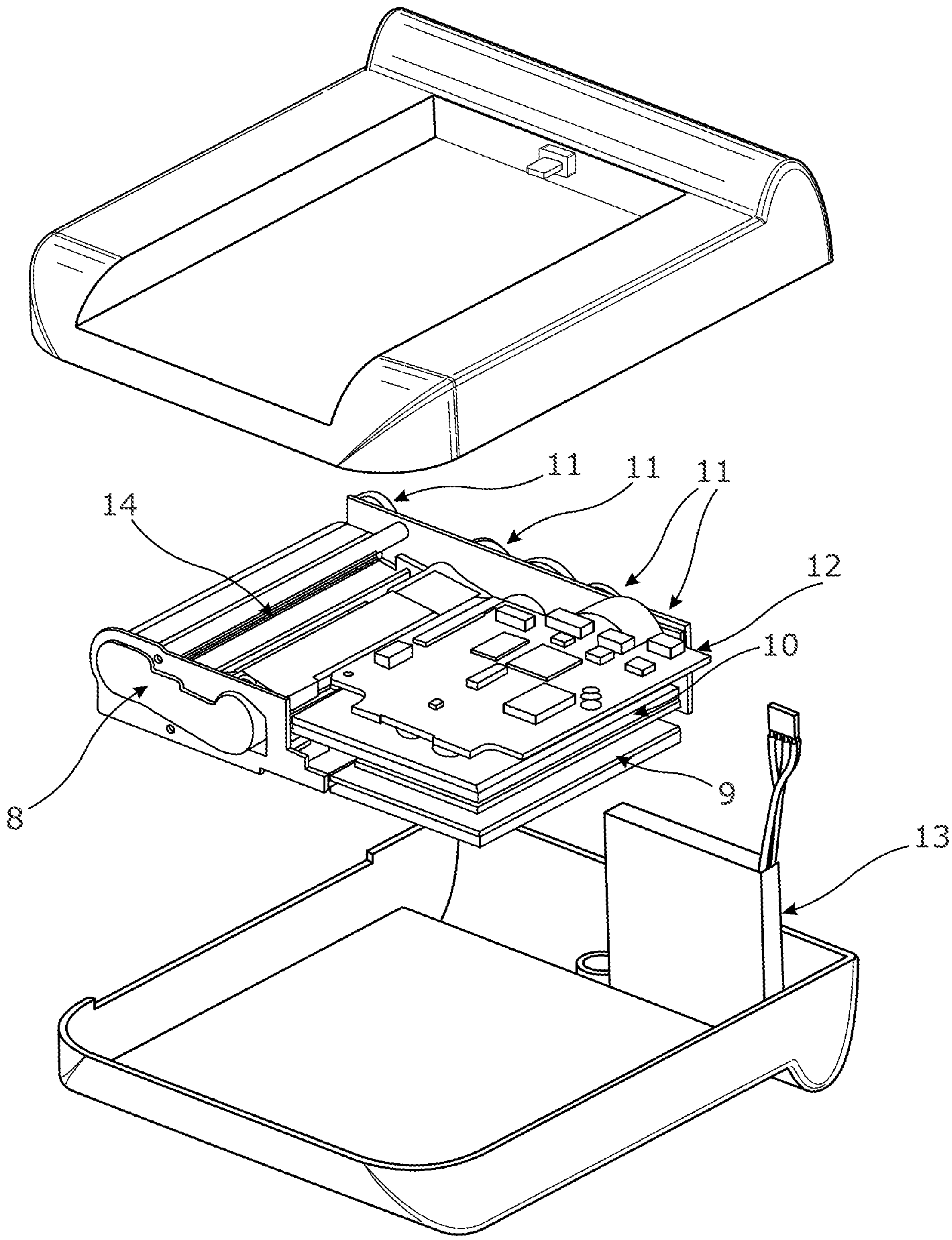
FIG. 4 shows an exploded interior view of the casing according to the present disclosure. This figure includes the PCB, battery, gears and rollers, dye-sublimation consumables cartridge containing the dye-sublimation ribbon, photo paper, and lenticular lens.

Based on the exemplary configuration of the system shown in the figures, the image forming apparatus uses gears and rollers 11 attached to a printed circuit board 12 containing the controller unit, sensor unit and communications interface coupled to a power source 13. The exemplary power source 13 is rechargeable via a charging connection to another power source. Another configuration of the power source 13 may include replaceable insertable batteries. The gears and rollers 11, as seen on FIG. 4, grip the substrate and drive the substrate to the dye-sublimation printhead 14 which prints the image directly onto the substrate.

Figure 5:
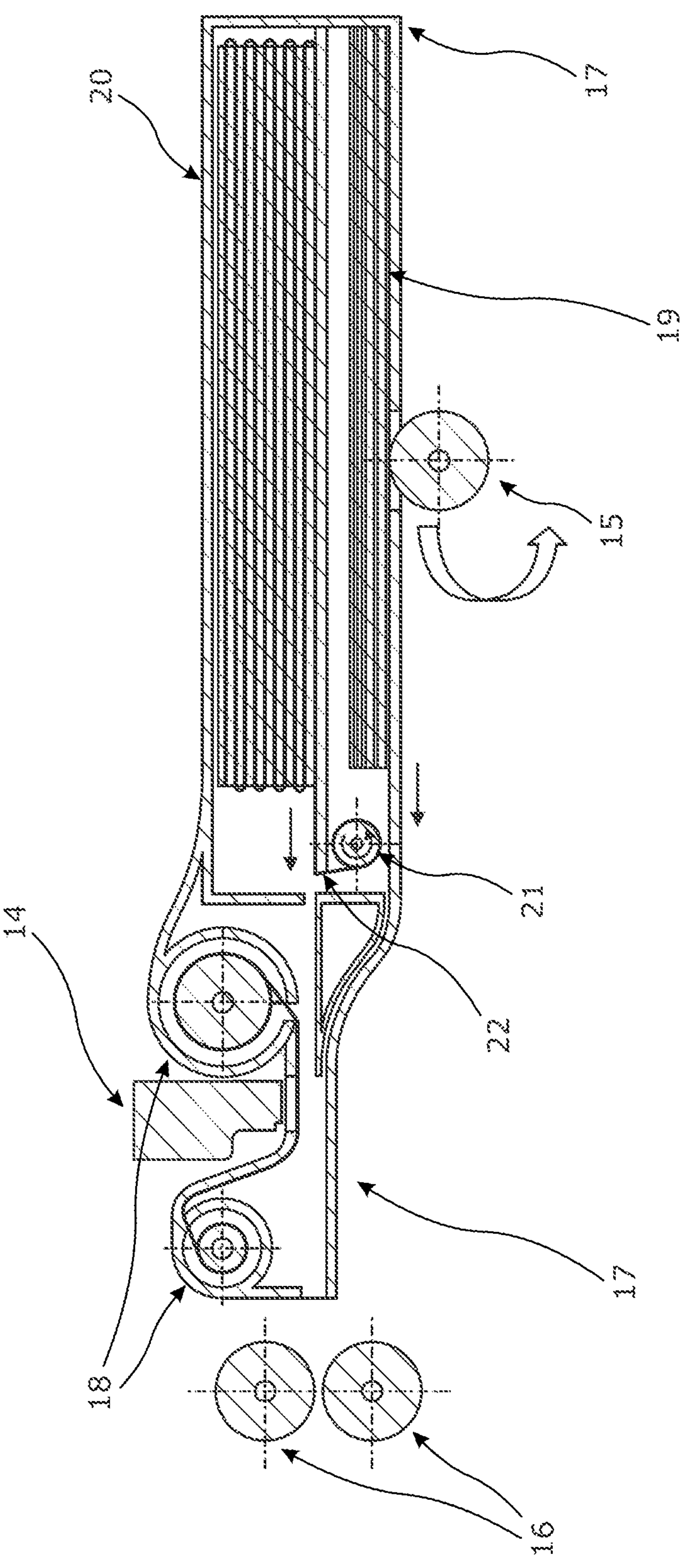
FIG. 5 shows a cross-cut side view of the consumables cartridge, dye-sublimation printhead, rollers associated with the consumables cartridge and peeling method for stripping the lenticular lens of its plastic backing and storing the plastic backing inside of the consumables cartridge according to the present disclosure.

In the configuration seen in FIG. 5, the image forming apparatus first grips the photo paper 9 using a roller 15 and drives the photo paper 9 forward to the dye-sublimation printhead 14. The photo paper 9 is driven using mechanical constraints but can be configured to include photosensor constraints to maintain the position of the photo. As the photo is printed the photo is ejected from the invention via final rollers 16. If another layer of colour is need to be printed, the image forming apparatus will re-ingest the photo and use mechanical constraints to maintain the position of the photo. The image forming apparatus can use photosensors to ensure the position of the photo is at the desired position. Depending on the configuration, after the image forming apparatus has finished printing the colours of the photo, the image forming apparatus can either print a clear protective layer or can draw the photo into a specific position within the invention in preparation for the bonding of the lenticular lens 10 to the photo paper 9. The position of the photo paper 9 and lenticular lens 10 can be controlled by mechanical and photosensor constraints to ensure the desired alignment. In one configuration of the photo paper 9 can be adhered with the lenticular lens 10 through a heating element which bonds the lenticular lens 10 to the photo paper 9. In another configuration, not shown, the image forming apparatus prints the photo onto the lenticular lens directly and then applies heat to bond a backing material such as white vinyl backing to the lenticular lens 10.

Figure 6:
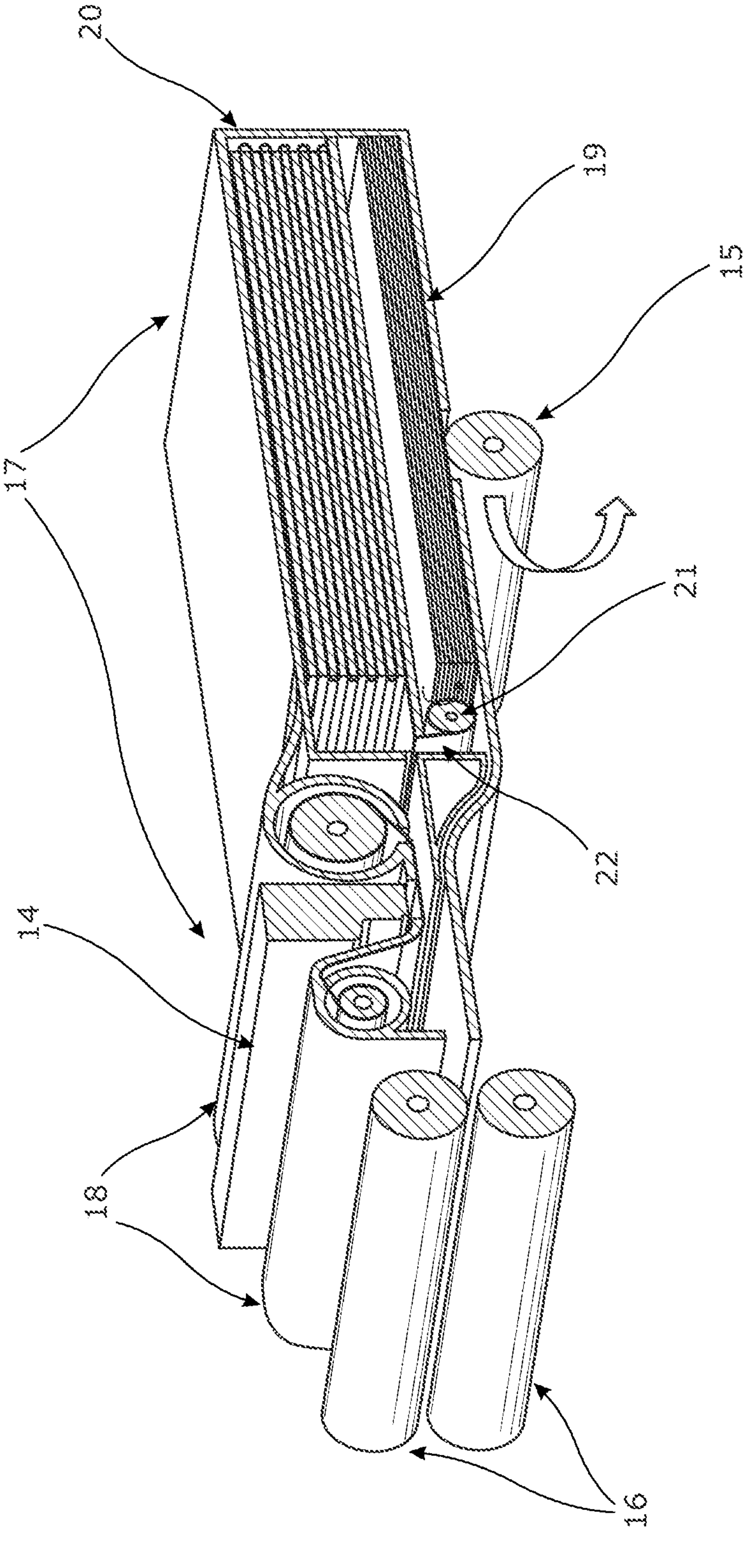
FIG. 6 shows a cross-cut isometric view of the consumables cartridge, dye-sublimation printhead, and rollers associated with the consumables cartridge according to the present disclosure.

FIGS. 5 and 6 illustrate a consumables cartridge 17 containing a dye-sublimation ribbon container 18, photo paper container 19, and lenticular lens container 20. These figures additionally illustrate steps to bond a lenticular lens 10 with photo paper 9. In this configuration the image forming apparatus draws forward the lenticular lens 10 using a roller 21. As the roller 21 draws the lenticular lens 10 forward a plastic layer 22 which protects a layer of glue applied to the lenticular lens is peeled off. As the layer 22 is peeled off it is drawn into a cavity inside of the consumables cartridge 17, allowing for the easy storage of waste product. The plastic layer 22 attached to the lenticular lens 10 can either be individually attached to each lenticular lens 10, which would necessitate a hollow cavity in the consumables cartridge 17 to store the plastic layers 22; or the plastic layer 22 can be one continuous layer with lenticular lens 10 affixed at distinct points. The latter method allows for one roller 21 to wrap the plastic layer 22 around itself and eliminate the need for a distinct hollow cavity to store the plastic layers 22.

Figure 7:
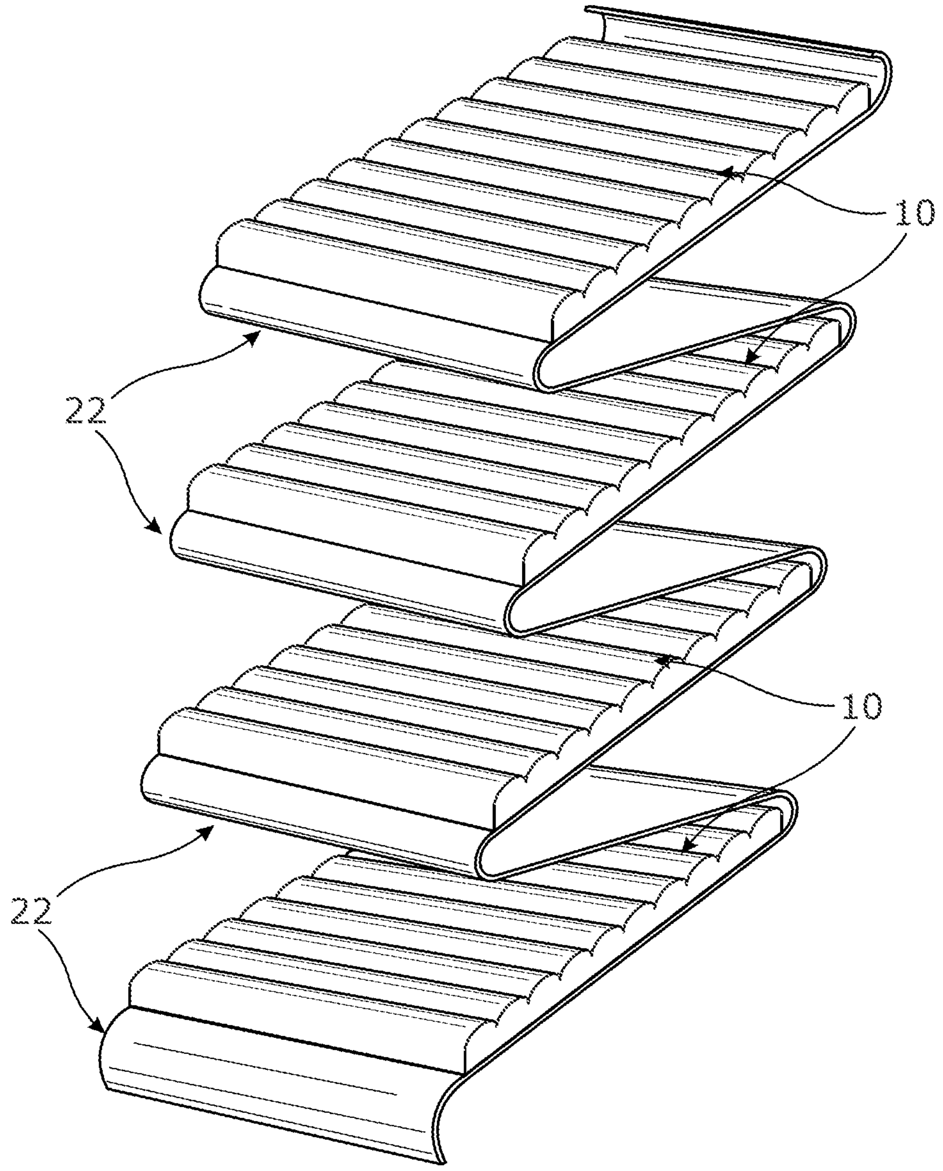
FIG. 7 shows a series of lenticular lens affixed to one strip of plastic underlayer according to the present disclosure.

FIG. 7 depicts a configuration of a series of lenticular lens 10 affixed on one continuous strip of plastic underlayer 22 as described above.

Figure 8:
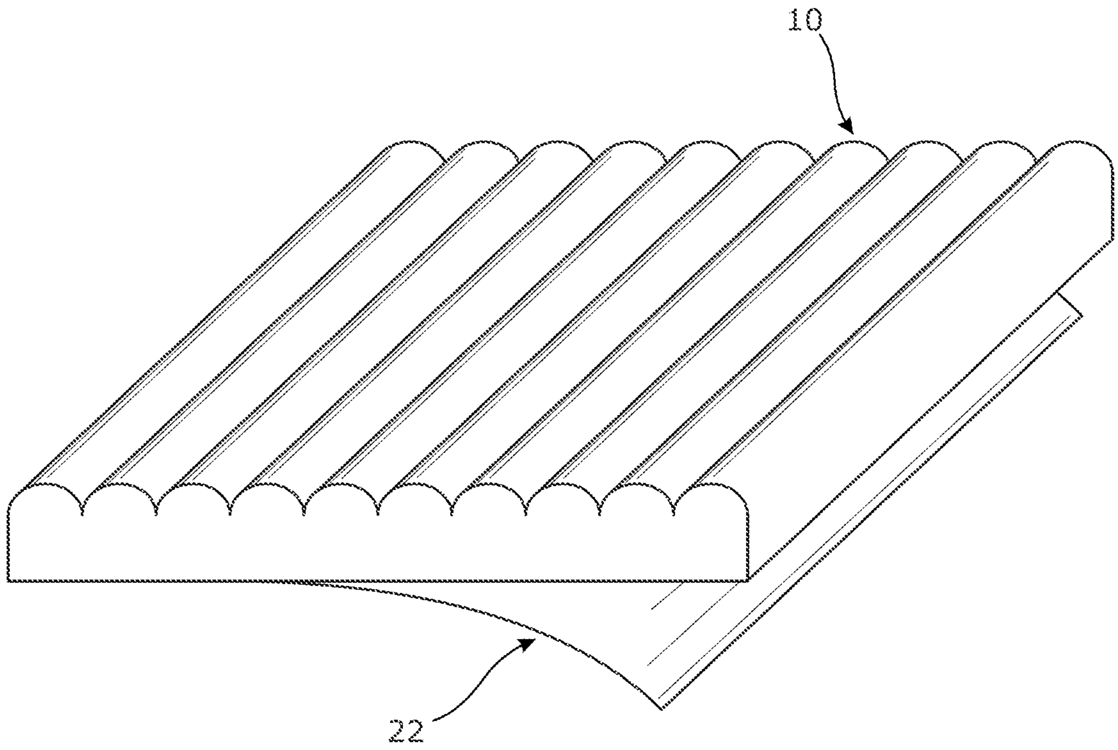
FIG. 8 shows a single lenticular lens according to the present disclosure.

In FIG. 8 an example of a lenticular lens 10 and plastic underlayer 22 is depicted. The lens refracts light based on the orientation of the viewer to display underlying images. A lenticular lens 10 can be configured to allow for each eye to see the same image, different images, or a series of different images as will be appreciated by the skilled person.

Figure 9:
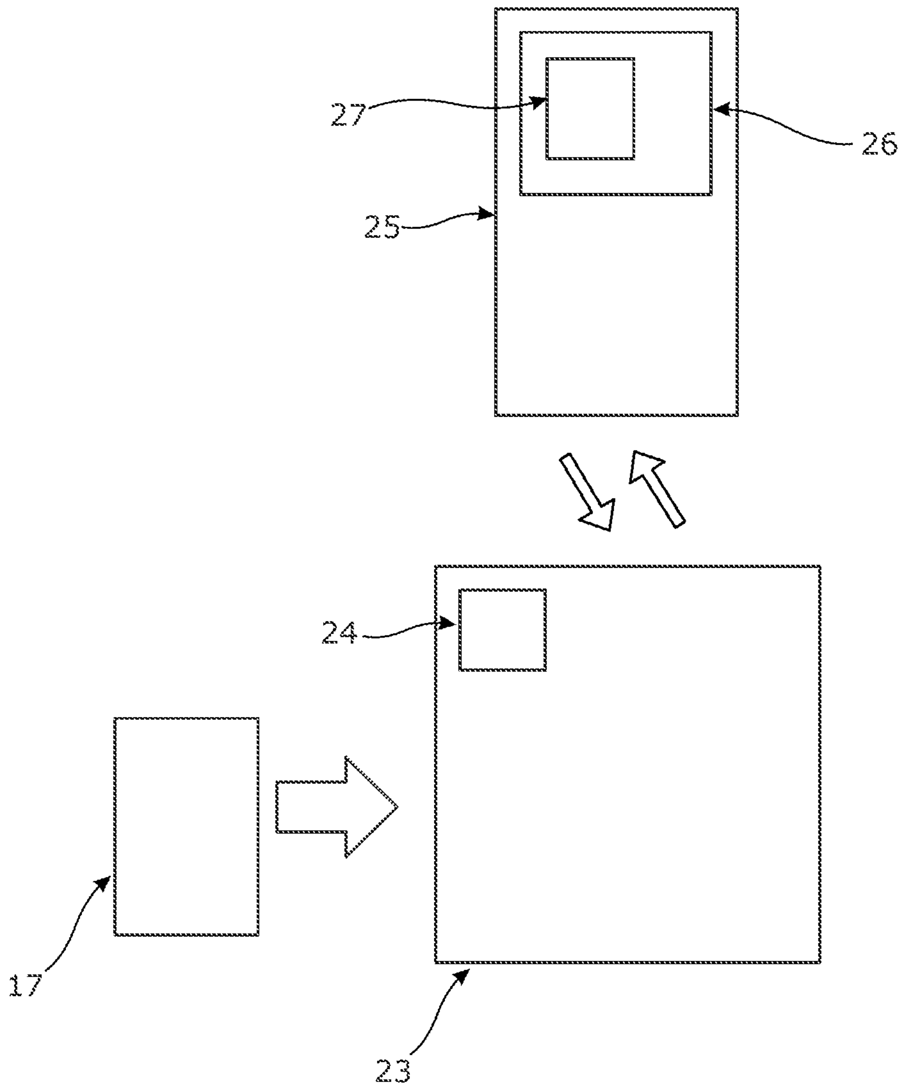
FIG. 9 shows the process of interlacing two images to create a two-image lenticular flip image according to the present disclosure.

FIG. 9 illustrates steps of how the image forming apparatus 23 creates a lenticular photo. The image forming apparatus uses a sensor 24 to identify the type of cartridge 17 that is inserted in the invention. The sensor 24 in the image forming apparatus 23 registers the consumable 17 that has been inserted into the system. The sensor 24 sends information on the consumable 17 to the connected electronic device 25 connected to the image forming apparatus 23 through means of Bluetooth™, Wifi™, NFC™, or wired connection. The connected electronic device 25 may be a mobile telecommunications device, tablet, laptop or other electronic device capable of receiving and transmitting information. The software 26 in the connected electronic device 25 communicates to the image forming apparatus 23 information including but not limited to what type of consumable 17 is inserted, how many times has the consumable 17 been used, how many prints remain in the consumable 17. The software 26 in the connected electronic device 25 populates this information as well for the user in an associated application 27. Using the application 27 the user may select and or capture one or more photos. Based on the setting the user selects, the application 27 can interlace multiple photos to create different effects in the final print such as 3D, motion, flip, zoom, pixelation, or more. After the user has selected and/or captured their photos the application 27 sends to the image forming apparatus 23 the information of what is to be printed.

The image forming apparatus 23 is provided with a computer-readable storage medium, for example a memory on a printed circuit board (PCB) of the image forming apparatus. Suitable processing resources provided on the PCB, for example one or more processors, ASICs or other computing resources read the printing instructions and causing the components of the image forming apparatus to initiate the photo printing process.

If the photo is a lenticular photo, the image forming apparatus first grips the photo paper 9 using rollers and brings 11 the photo paper 9 to the dye-sublimation printhead 14. Based on the information sent to the image forming apparatus 23 it will print the photo in one or more layers of colours. The photo is printed while it is being ejected from the image forming apparatus until it reaches the end of the printing layer. If the photo requires multiple layers of print, such as cyan, magenta, yellow, black, and clear then the image forming apparatus re-ingests the photo to print the next layer using the same method.

As described above, the image forming apparatus may use both physical constraints as well as photosensors to maintain the alignment of the print during the printing and lenticular adhesion process.

If the invention is printing a lenticular photo it may align the photo paper 9 and lenticular lens 10 using physical constraints and photosensors. Once the invention has aligned the photo paper 9 it can then draw forward the lenticular lens 10 using rollers 11. As the lenticular lens 10 moves forward in the invention an underlayer of plastic coating 22 under the lenticular lens is gripped by another roller 21 and drawn into a hollow space within the cartridge. The purpose of this plastic underlayer 22 is to protect an adhesive coating on the underside of the lenticular lens 10 from bonding until desired. As the lenticular lens 10 is drawn forward it is pressed onto the photo paper 9. This bonded lenticular lens 10 and photo paper 9 are drawn through another set of rollers 16 which presses the two substrates tightly, pushing out air bubbles that may result.

No doubt many other effective alternatives will occur to the skilled person. It will be understood that the invention is not limited to the described embodiments and encompasses modifications apparent to those skilled in the art lying within the scope of the claims appended hereto.

For example, the disclosure illustrated in the Figures may use one or more of the other bonding methods described above, including bonding through heat, UV, or pressure-activated adhesives.

For example, multiple feeders for consumables rather than just one port 7 (one for dye-sublimation ribbon 8, one for lenticular lens 10, one for photo paper 9) may be provided in the housing and used in the place of a replaceable cartridge 17.

For example, as described above, the image forming apparatus may print directly onto the lenticular lens 10 substrate and whereby the image substrate is a layer of white vinyl or other material bonded thereover to protect the printed image.

The invention claimed is:

1. An image forming apparatus for lenticular image printing, the apparatus comprising:

a housing enclosing a plurality of rollers and a dye sublimation print head comprising a heating element, wherein one or more removable cartridges are configured to couple to the housing, wherein the one or more removable cartridges comprise: a dye sublimation ribbon; a store of an image substrate; and a store of a lenticular lens substrate;

wherein, when the one or more removable cartridges are coupled to the housing, the plurality of rollers is configured to load the dye sublimation ribbon from the one or more removable cartridges into the dye sublimation print head and move an image substrate from the store of the image substrate from the one or more removable cartridges, or a lenticular lens substrate from the store of the lenticular lens substrate from the one or more removable cartridges, to the dye sublimation print head, wherein the dye sublimation print head is configured to use the ribbon to form an image on the image substrate or on a surface of the lenticular lens substrate, the image comprising a plurality of interlaced images;

wherein the plurality of rollers is configured to move the lenticular lens substrate or the image substrate into contact with the other of the lenticular lens substrate or the image substrate, and wherein the image forming apparatus is configured to secure the lenticular lens substrate to the image substrate to form a lenticular image.

2. The image forming apparatus of claim 1, wherein a surface of the lenticular lens substrate is provided with an adhesive having a backing layer, and wherein one or more of the plurality of rollers is configured to peel the backing layer from the lenticular lens substrate when moving the lenticular lens substrate into contact with the image substrate.

3. The image forming apparatus of claim 1, wherein the heating element of the dye sublimation print head is configured to heat the lenticular lens substrate and/or image substrate to bond the lenticular lens substrate to the image substrate to form the lenticular image.

4. The image forming apparatus of claim 1, wherein one or more of the plurality of rollers is configured to apply a pressure to the lenticular lens substrate and/or image substrate to bond the lenticular lens substrate to the image substrate to form the lenticular image.

5. The image forming apparatus of claim 1, comprising a source of ultraviolet light configured to illuminate the lenticular lens substrate and/or image substrate to bond the lenticular lens substrate to the image substrate to form the lenticular image.

6. The image forming apparatus of claim 2, wherein the plurality of rollers comprises:

a first roller and a press configured to align the image substrate and lenticular lens substrate during said heating.

7. The image forming apparatus of claim 1, wherein the one or more removable cartridges are coupled to the housing.

8. The image forming apparatus of claim 6, wherein the plurality of rollers comprises:

a second roller positioned at the one or more removable cartridges for moving the image substrate from the store when the one or more removable cartridges are coupled to the housing;

a third roller positioned at the one or more removable cartridges for moving the lenticular lens substrate from the store when the one or more removable cartridges are coupled to the housing; and a fourth roller positioned at the dye sublimation print head for moving the image substrate passed the dye sublimation print head during said forming of said image, and wherein the first roller and press are positioned at an opening in the housing and configured to eject the lenticular image from the apparatus upon completion.

9. The image forming apparatus of claim 1, comprising a controller unit and a motor, the motor being coupled to the plurality of rollers with one or more gear assemblies, wherein the controller unit is configured to control said motor to drive said plurality of rollers, and to control said dye sublimation print head during said forming of the lenticular image, wherein the controller unit is configured to prevent the apparatus from forming said lenticular image when the sensor unit is unable to identify the cartridge type.

10. The image forming apparatus of claim 9, comprising a sensor unit coupled to the controller unit and configured to detect insertion of the one or more removable cartridges into the housing and identify a cartridge type of the one or more removable cartridges.

11. The image forming apparatus of claim 9, comprising a communications interface for coupling the controller unit to an external device using a wired or wireless connection.

12. The image forming apparatus of claim 11, wherein the housing defines a shaped receiving surface and a clamp for holding the external device thereon and further comprising a printed circuit board enclosed in the housing, wherein the controller unit, sensor unit and communications interface are coupled to the printed circuit board and a power source.

13. The image forming apparatus of claim 1, wherein the image forming apparatus is further configured to print a static image, the plurality of rollers being configured to move the image substrate from the store to the dye sublimation print head, the dye sublimation print head being configured to use the ribbon to form an image on the image substrate, and the plurality of rollers being further configured to eject the static image from the apparatus upon completion.

14. The image forming apparatus of claim 1, wherein the image substrate comprises a photo paper substrate or a layer of white vinyl.

15. The image forming apparatus of claim 1, wherein store of lenticular lens substrate comprises a continuous strip having a plurality of lenticular lens substrates provided thereon.

16. The image forming apparatus of claim 15, wherein the lenticular lens substrates are provided on the continuous strip spaced apart by predetermined intervals, each interval substantially the length of the lenticular lens substrates, and wherein the continuous strip is folded a plurality of times, each fold being at a beginning and at an end of the respective intervals, and wherein the folded continuous strip is provided in a stacked configuration inside the store of lenticular lens substrate.

17. A method for printing a lenticular image using an image forming apparatus, the method comprising:

inserting a dye sublimation ribbon, an image substrate; and a lenticular lens substrate into a housing of the image forming apparatus, wherein said inserting comprises coupling one or more removable cartridges to the housing of the image forming apparatus, wherein the one or more removable cartridges comprise: said dye sublimation ribbon; a store of image substrates, including said image substrate; and a store of lenticular lens substrates including said lenticular lens substrate;

with a plurality of rollers, loading the dye sublimation ribbon into a dye sublimation print head and moving the image substrate from the store to the dye sublimation print head;

with the dye sublimation print head, forming an image on the image substrate, the image comprising a plurality of interlaced images;

with the plurality of rollers, moving the lenticular lens substrate into contact with the image substrate; and securing the lenticular lens substrate to the image substrate to form the lenticular image.

18. One or more cartridges for coupling to the housing of the image forming apparatus of claim 1, the one or more cartridges comprising:

a dye sublimation ribbon for loading into a dye sublimation print head of the image forming apparatus;

a store of image substrate; and a store of lenticular lens substrate.

19. The one or more cartridges of claim 18 further comprising a physical or electronic mechanism to indicate to the image forming apparatus whether the lenticular lens substrate is for producing an animated lenticular image or a stereoscopic lenticular image.

* * * * *